United States Patent Office 3,129,189
Patented Apr. 14, 1964

3,129,189
PROCESS FOR PREPARING A SILICA-MAGNESIA-FLUORINE HYDROCARBON CRACKING CATALYST
Charles P. Wilson, Jr., Cincinnati, Ohio, and Frank G. Ciapetta, Silver Spring, and James W. Elston, Jr., Baltimore, Md., assignors to W. R. Grace & Co., New York, N.Y., a corporation of Connecticut
No Drawing. Filed June 8, 1960, Ser. No. 34,628
4 Claims. (Cl. 252—441)

This invention relates to hydrocarbon cracking catalysts and in particular to the preparation of silica-magnesia-fluorine composites suitable for such use.

Silica-magnesia catalysts have been prepared by a process which involves mixing a silica gel with a colloidal magnesia-magnesium oxysalt complex to effect a swelling of the resulting product. The disadvantages in this technique is that the magneisum oxide reacts with water and with aqueous solutions of certain salts to form compounds having cementitious properties. For example, magnesium oxide interacts with magnesium chloride to form Sorel cement and a similar result is obtained when the sulphate is substituted for the chloride.

Rigid controls are practiced to prevent solidification and lumping of the reaction mixture in preparing a silica-magnesia catalyst via the oxysalt route. This involves the introduction of additional water into the magnesia-magnesium oxysalt system. The added water, however, has definite drawbacks. Firstly, the reaction in forming the oxysalt is retarded considerably which adversely affects combination of the magnesium oxide with the silica gel in a subsequent processing step. Secondly, the excess water places an added load on processing equipment, particularly in filtering and drying the magnesia-silica slurry.

It is, therefore, an object of this invention to prepare a silica-magnesia hydrocarbon cracking catalyst via the magnesium oxysalt route without resorting to steps to prevent lump formation of the compound. This objective is realized by forming a dispersion of silica hydrogel, and adding calcined magnesia to the dispersion together with a suitable acid until a proper ratio is obtained to form the corresponding magnesium oxysalt in situ. The resulting complex composite is then aged and filtered following which a compound yielding fluoride ions is added thereto to incorporate a desired amount of fluorine into the final catalyst. The fluorinated composite is dried, purified and finally redried.

By adding the calcined magnesia directly to the silica hydrogel, advantage is taken of the large volume of dispersing media which permits the use of any desired ratio of magnesia to the corresponding salt and allows use of highly active magnesia without danger of lump formation or solidification of the mass. The co-addition of the acid, such as sulphuric, with the requisite quantity of magnesia obtains the desired split in forming the magnesium sulphate and oxysulphate in situ.

In carrying out the process, the silica component may be formed by any one of several established procedures. It is preferably prepared by reacting an aqueous solution of an alkali metal silicate, such as sodium silicate, with a mineral acid, which may be sulphuric, hydrochloric, nitric acid, etc., but for economic reasons it is usually sulphuric. The starting sodium silicate solution is diluted and may be any commercially available water glass having a $SiO_2:Na_2O$ weight ratio of from about 1:1 to 4.0:1, the grade most readily available is one having a ratio of about 3.25:1 to 3.30:1. In the present process, the $SiO_2$ concentration of the diluted silicate solution is maintained as high as practical to improve the activation properties of the resulting catalyst and afford greater rates of production. The broad range of silica concentration is about 4% to 12% and preferably 5% to 10%.

Hydrogel formation is effected by the addition of sulphuric acid to the silicate solution. During acid addition the mixture is vigorously agitated to keep the resulting hydrogel particles well dispersed. Such dispersion permits better chemical combination between the gel particles and the subsequently-added magnesia. The amount of acid added to the silicate solution determines to a great extent the attrition of the final catalyst, the activation characteristics of the silica gel-magnesium oxysalt mixture, and the facility of washing the dried product. Generally, the attrition characteristics of the final product are unsatisfactory when less than 80% of the $Na_2O$ in the sodium silicate is neutralized. It is preferred to add acid in amount sufficient to neutralize about 90% of the $Na_2O$. When neutralization is carried out substantially above 90%, the silica gel tends to peptize and severe solidification occurs when even small quantities of magnesia are subsequently added thereto.

In preparing the silica hydrogel, acid addition is effected in two stages. In the first stage, sufficient acid is added to the sodium silicate solution to form a hydrogel in which the remaining unneutralized sodium silicate is supported. After a short period of time, additional acid is introduced to neutralize at least 80% and preferably about 90% of the $Na_2O$. Throughout the neutralization stages, the reaction mixture is continuously agitated to prevent the resulting hydrogel from hardening or setting up to a rigid mass. The pH of the slurry after the second stage of acid addition lies within the range of 5 to 8 and preferably about 6 or 7.

The temperature of the slurry during and after neutralization to the desired pH is controlled within the range of about 80–150° F., and preferably within 110–130° F. Temperatures in excess of the maximum range should be avoided because of the tendency of the magnesia to form hard lumps before adequate dispersion of the silica hydrogel has been effected. After the requisite amount of neutralizing acid has been added to the silicate solution, the hydrogel slurry is aged with agitation for a period of about ½ to about 4 hours at the above stated temperatures. Aging at elevated temperatures materially assists in increasing the pore size of the gel.

The gelation temperature and the aging time of the hydrogel slurry also determine the time, or temperature, which must be subsequently employed, after addition of the magnesia and the oxysalt-forming acid, to bring the silica hydrogel particles into proper combination with the magnesia. The higher the gelation temperature and the longer the aging time of the hydrogel slurry, then a longer time and higher temperature is required in aging the silica-magnesia slurry. The desired pore volume and, to a lesser degree, the surface area in the final product are obtained by balancing the hydrogel slurry holding time and temperature with that of the silica-magnesia slurry holding time and temperature.

After the hydrogel slurry has been aged for the required period, there is then added, with continued agitation, an amount of magnesia together with sulphuric acid to give the desired MgO content in the final catalyst. Actually, the initial amount of magnesia added to the gel slurry slightly exceeds the desired amount in the final product to compensate for the loss of water-soluble magnesium compounds through the reaction of MgO, or the formed $MgSO_4$ with MgO, or the multiplicity of inter-reactions initiated when the sulphuric acid reacts with the magnesia. In the present process, the amount of added magnesia is regulated to give 20–30% MgO in the catalyst and is based on the $SiO_2$ content of the sodium silicate solution.

Magnesia suitable for this invention had the following typical analysis:

| | Percent, overall basis |
|---|---|
| Magnesium as MgO | 94.86. |
| Aluminum as $Al_2O_3$ | 1.09. |
| Sulphate as $SO_4$ | 1.65. |
| Sodium as $Na_2O$ | 0.073. |
| Iron as Fe | 0.087. |
| Calcium as CaO | 1.0. |
| Silicon as $SiO_2$ | 0.26. |
| Loss on ignition @ 1750° F. | 2.38. |
| Density (compacted) | 26.0 lbs./ft.$^3$. |
| Surface area | 45 m.$^2$/g. |

Agitation of the resulting silica-magnesium oxysulphate complex is continued until a uniform colloidal dispersion is obtained. The temperature of the slurry is then increased to a range between about 175° F. and 185° F., and preferably 180° F. at which time the pH is about 7.5 to about 8.5, and preferably about 8.0. By depositing the electrolyte ($SO_4^=$) on the magnesia, a more reactive form is obtained for intimate combination with the silica. The acid concentration in forming the oxysalt may range between about 20% to 70% $H_2SO_4$, preferably between 20% and 40% $H_2SO_4$.

The slurry containing the silica-magnesium oxysulphate complex is aged from about 1 to 3 hours at about 180° F. with agitation. During the aging period, the pH of the slurry drops to a value within the range of 7.0 to 8.0, and generally about 7.0 to 7.5. Following the aging period, the slurry is primarily filtered to remove the soluble sulphates. After such filtration, the filter cake is reslurried with water to which a solution of a magnesium salt, such as $MgSO_4.7H_2O$, may be added to provide free magnesium ions.

To the reslurry there is then added a quantity of a solution containing dissolved fluorine at a concentration sufficient to incorporate 0.5 to 5.0 weight percent of residual fluorine in the final catalyst. Any soluble fluoride which preferentially forms an insoluble salt with magnesium ions so as to be retained in the mass subsequent to washing may be used. The use of a soluble fluoride permits maximum dispersion of the fluoride ion within the silica-magnesia composite before chemical combination occurs. Suitable fluoride-yielding compounds are HF, $H_2SiF_6$, $(NH_4)_2SiF_6$, $NH_4F$ and $NH_4HF_2$ of which HF is preferred primarily because of its low cost and commercial availability in large quantities. To control fuming, the HF is diluted in sufficient water, generally to about a 50% solution. Excess water should be avoided to prevent decomposition of the complex. After the fluoride compound has been added, the pH of the resulting slurry drops to about 6.5.

The incorporation of the fluorine at this point of the process obtains a better dispersion within the mass. Moreover, attempts to add a soluble fluoride at a stage before removal of some of the free sodium ions have resulted in formation of insoluble sodium fluoride within the catalyst. The deleterious effect of sodium ions on the catalyst life are well known.

Following addition of the fluorine into the composite, the slurry is fed into a spray dryer to form the particles into microspheres. The particles are then collected and purified of residual sodium and sulphate ions by a suitable washing treatment. Care should be exercised to avoid removal of magnesium ions during such treatment. A satisfactory wash procedure involves using dilute aqueous solutions of magnesium sulphate or ammonium sulphate followed by several rinses with water. The washed material is then filtered and redried at about 300° F.

As thus described, the present invention provides a process which eliminates the prior practice of adding copious quantities of water to avoid formation of hard lumps of Sorel cement. This is accomplished by forming the complex compound in situ by co-adding the magnesia and acid to the silica hydrogel slurry. The handling of large amounts of water, which taxes the facilities of commercial operations, is thus totally eliminated without affecting the quality of the final catalyst.

The invention is further illustrated by the following example:

EXAMPLE 27 gallons of sodium silicate at 120° F. and containing 27.6 g./l. $Na_2O$ and 91 g./l. $SiO_2$ were reacted in a mixing tank with 3950 cc. of 39% $H_2SO_4$. The reactants were thoroughly agitated by means of a rotating mixer and continuously recirculated by means of a centrifugal pump. Gelation occurred at 125° F. within 7 minutes and at a pH of 10.7. Mixing was continued for about 10 minutes at 125° F. after which time 4,530 cc. of 39% $H_2SO_4$ were added. The pH dropped to 6.5 and the resulting silica hydrogel slurry was aged for 1½ hours at 125° F. To the aged hydrogel slurry there were then simultaneously added with agitation 8¾ pounds of calcined magnesia and 2,370 cc. of 39% $H_2SO_4$. During the co-addition of acid and magnesia, the pH ranged between 9.0 to 9.4. The temperature of the resulting silica-magnesium oxysulphate complex composite was raised to 180° F. in 20 minutes at which time the pH of the slurry dropped to 8.05.

The silica-magnesium oxysulphate complex composite prepared according to the procedure of the example was split into two portions designated as part A and B. Part B was split again into a third portion designated as part B (1). Each of these portions were further treated as follows:

*Part A.*—The silica-magnesium oxysulphate complex was aged for 1 hour at 180° F. after which time the pH dropped to 7.4. It was then filtered and 15 pounds of the recovered filter cake were reslurried with 720 cc. of water containing 210 grams of $MgSO_4.7H_2O$. Thereafter 81 grams of 48% HF solution were added and the fluorinated slurry was spray dried. The spray dried product had a pH of 7.0 and a total volatile (T.V.) content of 12.63%. 400 grams of the dried product were then washed with 2 liters of 2% $(NH_4)_2SO_4$ solution to which sufficient ammonia had been added to give the wash solution a pH of 9.0. The temperature was maintained at 90° F. The particles were washed three times in this fashion. Thereafter, the product was rinsed three times with 2-liter lots of distilled water to which ammonia had been added to a pH of 9.0. The thus-purified product was re-dried at 300° F. in an oven to a T.V of about 15.0%.

*Part B.*—The treatment of this portion differs from part A only in the aging time of the silica-magnesia oxysulphate complex, which was 2 hours at 180° F. The pH dropped to 7.3, and it was thereafter filtered and treated in all respects in the same manner as part A.

*Part B(1).*—This portion was aged for 2 hours at 180° F. at which time the pH dropped to 7.3. It was then filtered and reslurried with 750 cc. of water only. No MgSO₄·7H₂O or HF solution was added. The slurry was then spray dried to a T.V. of 12.91% and had a pH of 7.4. The spray dried product was then washed in the same manner as described in part A.

Chemical analyses and physical properties of the catalysts prepared according to the preceding example are set forth in Table I.

*Table I*

| Chemical Analysis, percent, dry basis | Part A | Part B | Part B(1) |
|---|---|---|---|
| MgO | 29.0 | 27.99 | 27.86 |
| Na₂O | 0.025 | 0.021 | 0.017 |
| SO₄ | 0.52 | 0.080 | 0.11 |
| Fe | 0.042 | 0.044 | 0.080 |
| F | 2.62 | 2.49 | None. |
| Physical Properties: | | | |
| Thermal Pretreatment 3 hrs., @ 1,250° F.— | | | |
| Surface Area, m.²/g | 525 | 526 | 484 |
| Pore Volume (H₂O), cc./g | 0.68 | 0.59 | 0.46 |
| Pore Volume (N₂), cc./g | 0.56 | 0.52 | 0.43 |
| Thermal Pretreatment 3 hrs., @1,550° F.— | | | |
| Surface Area, m²./g | 194 | 176 | 43 |
| Pore Volume (H₂O), cc./g | 0.44 | 0.36 | 0.06 |
| Pore Volume (N₂), cc./g | 0.35 | 0.29 | 0.06 |
| Attrition Index | 35.8 | 18.4 | |

The attrition index is obtained by subjecting the catalyst to a high velocity air jet by a standard test known as the roller test. The weight of minus 20 micron particles formed during the test is measured as a criterion of the resistance of the catalyst to inter-particle attrition. The index is obtained by the formula $$\frac{100(A-B)}{C}$$

where $A$ = 0–20 micron content of calcined catalyst after attrition, in grams;
$B$ = 0.20 micron content of calcined catalyst before attrition, in grams; and
$C$ = plus 20 micron content of calcined catalyst before attrition, in grams.

It is noted that the catalyst of part B gave a satisfactory attrition index while the attrition index of the catalyst of part A did not. The index of the latter was approximately doubled and this is believed to be due to incomplete aging of the silica-magnesium oxysulphate complex.

In order to determine the cracking activity and stability of catalysts of the type prepared by this invention, an accelerated test has been devised to simulate the conditions prevalent during the early period of catalyst use where the decrease of catalyst stability is most pronounced. This test involves compressing a sample of fresh catalyst into pellets and splitting the pellets into two portions, one for thermal deactivation and one for steam deactivation. Thermal deactivation of the catalyst prepared according to the preceding example was carried out first at 1250° F. for 3 hours and afterward split into two portions. One portion was further heat treated for 3 hours at 1350° F. and the second portion was treated for 3 hours at 1550° F. Steam deactivation was carried out first by heat treatment for 3 hours at 1250° F., followed by treatment in an atmosphere of steam at 60 p.s.i.g. and 1050° F. for 24 hours.

In carrying out the activity tests, 200 ml. of deactivated catalyst were placed in a reactor and maintained at a temperature of 850° F. During a period of 2 hours, 238.2 ml. of virgin East Texas light gas oil were passed through the hot catalyst. The cracked products were recovered and separated. The fraction which distilled below 400° F., as well as gas and loss, was determined and designated as distillate plus loss, or more simply, $D+L$. The results of these tests are reported in Table II:

*Table II*

| Steam Activity | Part A | Part B | Part B(1) |
|---|---|---|---|
| D+L, percent | 41.9 | 44.7 | 43.0 |
| G.P.F. | 0.97 | 0.85 | 0.86 |
| C.P.F. | 0.93 | 0.84 | 0.80 |
| Thermal Activity: | | | |
| 3 hrs. @ 1,350° F.— | | | |
| D+L, percent | 56.3 | 55.3 | 57.2 |
| G.P.F. | 0.92 | 0.87 | 0.91 |
| C.P.F. | 0.91 | 0.87 | 0.82 |
| 3 hrs. @ 1,550° F.— | | | |
| D+L, percent | 31.1 | 27.4 | 5.4 |
| G.P.F. | 0.87 | 0.83 | 2.03 |
| C.P.F. | 0.84 | 0.81 | 2.50 |

G.P.F. and C.P.F. refer to "gas producing factor" and "carbon producing factor" respectively. The values assigned these factors are relative to the gas and carbon produced by a standard catalyst, which is taken as 1.00 in both cases, and represent measures of catalyst selectivity. It is noted that the catalysts containing fluorine prepared according to the process of this invention gave carbon and gas values well below the standard catalyst. Of further significance is the excellent thermal stability of the catalysts when thermally treated at 1550° F.

It should be pointed out that the addition of 0.5 to 5.0% by weight of fluorine to the catalyst stabilizes the structure for operation at high temperature. This is exemplified by the catalyst prepared according to the process of the example, identified as part B(1), which did not contain fluorine. It is noted that thermal treatment of this catalyst at 1550° F. gave a $D+L$ of only 5.4%. This failure to withstand the high temperature indicates a substantially complete collapse of the catalyst structure.

We claim:

1. A process for preparing a silica-magnesia hydrocarbon cracking catalyst containing 0.5 to 5% fluoride which comprises:
   (a) diluting an alkali metal silicate solution to a silica to alkali metal oxide ratio of 1:1 to 4:1,
   (b) gelling the silicate by the addition of a mineral acid thereto, wherein sufficient acid is added to neutralize 80 to 90% of the Na₂O present and adjust the slurry pH to 5 to 8,
   (c) aging the silica gel at 80 to 150° F.,
   (d) simultaneously adding calcined MgO and H₂SO₄ to the gelled silicate in an amount sufficient to provide 20 to 30% MgO in the final catalyst and to adjust the slurry pH to 7.5 to 8.5,
   (e) aging at 175 to 185° F. for 1 to 3 hours,
   (f) filtering the composite,
   (g) adding a quantity of a solution of a soluble fluoride salt sufficient to provide 0.5 to 5% fluoride,
   (h) spray drying, washing, redrying and recovering the product.

2. A process according to claim 1 wherein the silicate is sodium silicate, the mineral acid used to gel the silicate is selected from the group consisting of sulfuric, hydrochloric and nitric acid, and the soluble fluoride salt used to provide the fluoride content of the catalyst is selected from the group consisting of HF, H₂SiF₆, (NH₄)SiF₆, NH₄F and (NH₄)₂HF₂.

3. A process for preparing a silica-magnesia hydrocarbon cracking catalyst containing 0.5 to 5% fluoride which comprises:
   (a) diluting a sodium silicate solution to a SiO₂ to Na₂O content about 3.3 to 1,
   (b) gelling the silicate in two stages by adding sufficient sulfuric acid to neutralize 80–90% of the Na₂O present and adjust the slurry pH to 5 to 8,
   (c) aging the silica gel at 80 to 110° F. for 0.5 to 4 hours, (d) simultaneously adding calcined MgO and $H_2SO_4$ to the aged silicate in an amount sufficient to provide 20 to 30% MgO in the final catalyst and adjust the slurry pH to 7.5 to 8.5, (e) aging the composite at 175 to 185° F. for 1 to 3 hours, (f) filtering the composite, washing the filter cake with dilute magnesium sulfate solution, (g) adding a quantity of hydrogen fluoride sufficient to provide about 0.5 to 5% fluoride in the final catalyst, (h) spray drying, washing, redrying and recovering the catalyst product.

4. A process for preparing a silica magnesia hydrocarbon cracking catalyst containing 0.5 to 5% fluoride which comprises:

(a) diluting a sodium silicate solution to an $SiO_2$ to $Na_2O$ content of about 3:3 to 1, (b) gelling the silicate in two stages by adding sulfuric acid in an amount sufficient to neutralize 80 to 90% of the $Na_2O$ present and adjust the slurry pH to 6 to 7, (c) aging the silica gel at a temperature of 110 to 130° F. for 0.5 to 4 hours, (d) simultaneously adding calcined MgO and $H_2SO_4$ to the gelled silicate in an amount sufficient to provide about 20 to 30% MgO in the final catalyst and adjust the pH to about 8.0, (e) aging the composite at about 180° F. for 1 to 3 hours, (f) filtering the composite, reslurrying with dilute magnesium sulfate solution, (g) adding sufficient HF to provide about 0.5 to 5% fluoride in the final catalyst, (h) spray drying, washing with aqueous solutions of magnesium sulfate and ammonium sulfate, rinsing with water, drying at about 300° F., and (i) recovering the product catalyst.

References Cited in the file of this patent

UNITED STATES PATENTS

| | | |
|---|---|---|
| 2,477,695 | Kimberlin | Aug. 2, 1949 |
| 2,901,440 | Wilson | Aug. 25, 1959 |